(12) United States Patent
Roy et al.

(10) Patent No.: US 8,219,581 B2
(45) Date of Patent: Jul. 10, 2012

(54) METHOD AND SYSTEM FOR ANALYZING ORDERED DATA USING PATTERN MATCHING IN A RELATIONAL DATABASE

(75) Inventors: Prasan Roy, Foster City, CA (US); Eric Friedman, Mountain View, CA (US); Peter Pawlowski, Menlo Park, CA (US); Rangarajan Vasudevan, Belmont, CA (US)

(73) Assignee: Teradata US, Inc., Dayton, OH (US)

( * ) Notice: Subject to any disclaimer, the term of this patent is extended or adjusted under 35 U.S.C. 154(b) by 462 days.

(21) Appl. No.: 12/464,897

(22) Filed: May 13, 2009

(65) Prior Publication Data
US 2010/0293196 A1 Nov. 18, 2010

(51) Int. Cl.
G06F 17/30 (2006.01)
(52) U.S. Cl. ...................................................... 707/770
(58) Field of Classification Search .................. 707/764, 707/770
See application file for complete search history.

(56) References Cited

U.S. PATENT DOCUMENTS

| | | | |
|---|---|---|---|
| 5,691,917 | A | 11/1997 | Harrison |
| 6,564,212 | B2 | 5/2003 | Koskas |
| 6,725,287 | B1 * | 4/2004 | Loeb et al. ............. 710/8 |
| 7,152,073 | B2 | 12/2006 | Gudbjartsson et al. |
| RE40,520 | E | 9/2008 | Doktor |
| 2004/0036716 | A1 | 2/2004 | Jordahl |
| 2007/0239741 | A1 | 10/2007 | Jordahl |

FOREIGN PATENT DOCUMENTS

| | | |
|---|---|---|
| EP | 1217540 A1 | 6/2002 |
| WO | WO-2008/034219 A1 | 3/2008 |

OTHER PUBLICATIONS

Relational Database Systems, Nov. 5, 2007, pp. 1-4.*
Oracle Corp, Complex Event Processing in the Real World, An Oracle White Paper, Sep. 2007, pp. 13, http://www.oracle.com/technologies/soa/docs/oracle-complex-event-processing.pdf (Last Visited May 14, 2009).
Oracle Corp, Towards a Streaming SQL Standard, pp. 12, http://www.cs.brown.edu/~ugur/streamsql.pdf (Last Visited May 14, 2009).
Wikipedia, Event Stream Processing, pp. 2, http://en.wikipedia.org/wiki/Event_Stream_Processing (Last Visited May 14, 2009).
Streambase, Products—Complex Event Processing (CEP), pp. 3 http://www.streambase.com/complex-event-processing.htm (Last Visited May 14, 2009).

(Continued)

*Primary Examiner* — John E Breene
*Assistant Examiner* — Albert Phillips, III
(74) *Attorney, Agent, or Firm* — Raj Abhyanker LLP

(57) ABSTRACT

Several methods and a system for analyzing ordered data using pattern matching over an indefinitely long ordered sequence of rows in a relational database are disclosed. In one embodiment, a method of a server includes receiving an ordered data in a relational database. The method further includes matching a pattern specified in a query on ordered data in a relational database in a single pass in constant space for overlapping mode of results. The method also includes creating an output data in the single pass in constant space for overlapping mode of results based on the matching of the ordered data with the pattern in the relational database query.

14 Claims, 13 Drawing Sheets

OTHER PUBLICATIONS

Expressing and Optimizing Sequence Queries in Database Systems, ACM Transactions on Database Systems, vol. 29, No. 2, Jun. 2004, pp. 37, http://www.cs.ucla.edu/~zaniolo/papers/todsjune04.pdf (Last Visited May 14, 2009).

Pattern matching in sequences of rows (11), ISO/IEC JTC1/SC32 WG3:URC-nnn ANSI NCITS H2-2006-nnn, Mar. 21, 2007, http://asktom.oracle.com/tkyte/row-pattern-recogniton-11-public.pdf (Last Visited May 14, 2009).

* cited by examiner

METHOD AND SYSTEM FOR ANALYZING ORDERED DATA USING PATTERN MATCHING IN A RELATIONAL DATABASE

FIELD OF TECHNOLOGY

This disclosure relates generally to a field of software technology and associated hardware, and more particularly to a method and system for analyzing ordered data using pattern matching in a relational database.

BACKGROUND

An ordered data may be an indefinitely long sequence of rows in a relational database. For example, click-stream data, a financial transaction data, a user interaction data, and a time series data may be the ordered data. A database analyst may seek to request information from a database to analyze ordered data but may be prevented from doing so by a lack of an ability to easily express the requirements in a query in an existing database language. The database analyst may be restricted to a limited query language that may limit the effectiveness of the analyst's ability to obtain information from the database.

The analyst may therefore seek ordered data inefficiently using an excessive number of queries. The data analyst may also be required to transfer the processed information of the database to a separate process to analyze the ordered data. The database analyst may therefore be required to spend an excessive amount of time obtaining information, which may lead to a delay, an additional cost of the analyst's time, an additional time for a processor usage, and a greater possibility of incurring a human made error. The database analyst may ultimately fail to find a desired information.

SUMMARY

This summary is provided to comply with 37 C.F.R. §1.73, which requests a summary of the invention briefly indicating the nature and substance of the invention. It is submitted with the understanding that it will not be used to limit the scope or meaning of the claims.

Several methods and a system for analyzing ordered data using pattern matching over an indefinitely long ordered sequence of rows in a relational database are disclosed.

In an embodiment, a method of a server includes receiving an ordered data in a relational database. The method further includes matching a pattern specified in a query on ordered data in a relational database in a single pass in constant space for overlapping mode of results. The method also includes creating an output data in the single pass in constant space for overlapping mode of results based on the matching of the ordered data with the pattern in the relational database query.

In another embodiment, a method of a server includes receiving an ordered data in a relational database. The method also includes matching a pattern specified in a query on ordered data in a relational database in a single pass in constant space for overlapping mode of results. The method further includes creating an output data in a single pass in constant space for overlapping mode of results based on the matching of the ordered data with the pattern in a relational database query. The method further includes specifying a pattern on the ordered data in the relational database. The method also includes specifying a required result in the relational database. In addition, the method includes matching the pattern in a single pass in constant space for overlapping mode of results with the ordered data. The method further includes computing the output data and generating an interpretation of a customizable database request which includes an extensible computer process. The method further includes providing an input guidance to available processors of an available computing environment. The method also includes automatically distributing an execution of the interpretation across the available computing environment operating concurrently and in a parallel clustered environment, wherein a component of the execution is limited to at least a part of an input data. In addition, the method includes automatically assembling a response using a distributed output of the execution in a single pass in constant time for overlapping mode of results.

In yet another embodiment, a system of a server includes a symbol module to assign a symbol to a certain tuple in a ordered data based on a predicate. The system also includes a determine module to determine which sequences of symbols in an ordered data match a pattern in a query. The system further includes a match module to match the sequences of symbols in the ordered data to the pattern in a query in a single pass in constant space for overlapping mode of results. The system further includes a function module to apply a function to determine an output based on the match.

In another embodiment, a method includes partitioning an ordered data into at least one group. The method also includes ordering the at least one group to form a sequence. The method further includes determining an ordered set of data through the partitioning of the ordered data and the ordering of the at least one group to form the sequence. The method also includes assigning symbols to certain tuples in the ordered data based on a predicates. The method further includes, responsive to a query, determining which sequences of symbols in the ordered data match a pattern in a query in single pass and constant space for overlapping mode of results. In addition, the method includes matching the sequences of symbols in the ordered data to the pattern in a query in a single pass and constant space for overlapping mode of results. The method also includes applying a function to determine an output in the single pass in constant space for overlapping mode of results based on the match.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Several methods and a system for analyzing ordered data using pattern matching over an indefinitely long ordered sequence of rows in a relational database are disclosed.

Although the present embodiments have been described with reference to specific example embodiments, it will be evident that various modifications and changes may be made to these embodiments without departing from the broader spirit and scope of the various embodiments.

Figure 1:
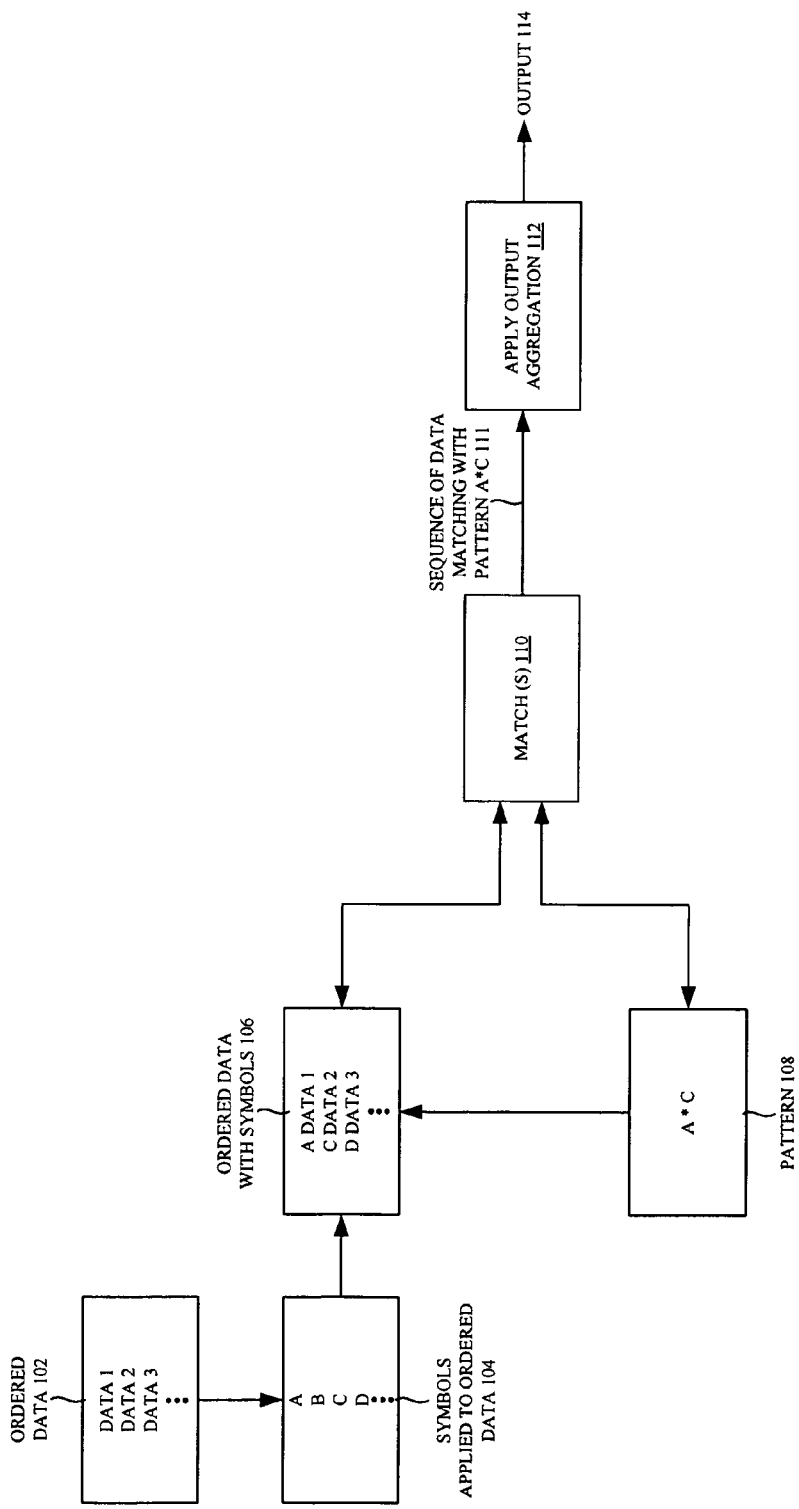
FIG. 1 is a system view of generating an output based on the matching of an ordered data with a pattern in a relational database, according to one embodiment.

FIG. 1 is a system view of generating an output based on the matching of an ordered data with a pattern in a relational database, according to one embodiment. Particularly, FIG. 1 illustrates an ordered data 102, symbols applied to ordered data 104, an ordered data with symbols 106, a pattern 108, a match (s) in a single pass in constant space 110, a sequence of data matching with certain defined pattern 111, apply output aggregation function 112, and an output 114, according to one embodiment.

In an example embodiment, the ordered data 102 may be a sequence data. The ordered data 102 may also include a click stream data, a financial transaction data, a user interaction data and a time series data. Furthermore, the ordered data 102 may be extracted from an unknown number of rows from the database. The ordered data may be a structured data or an unstructured data. A pattern of the ordered data 102 may be specified in a relational database. The relational database may be a form of database in which structure of entities or information items is captured as a set of tables and relations between entities or information items can be expressed using relational algebra. The ordered data 102 may be received in the relational database.

Symbols may be generated and applied to the ordered data 104. The assignment and definition of the symbols to the ordered data 102 may be based on a predicate. The relational database may include the ordered data 102 with symbols 106.

Also, the pattern 108 of the ordered data 102 in the relational database may be specified. The pattern 108 of the ordered data 102 may be designed by a programmer, a developer, an analyst and a database administrator of the database. The ordered data 102 with symbols 106 may be matched with the pattern 108 in the relational database. The pattern 108 may be specified in a query on ordered data in a relational database in a single pass in constant space for overlapping mode of results. The query may also specify the required result in and/or from the relational database.

In the example embodiment, the pattern may be A*C 111. The match(s) 110 function may perform the match between the ordered data 102 with symbols 106 and the pattern 108 in the relational database. The match(s) 110 function may be performed in a single pass in constant space for overlapping mode of results. The apply output aggregation function 112 may then generate the output 114 in a single pass and constant space for overlapping mode of results after taking the input from the output of the match 110 function. The output 114 may be generated based on the matching of the ordered data with the pattern 108 in the relational database query. Implementation of FIG. 1 may be better understood with an example as illustrated in FIG. 2.

Figure 2:
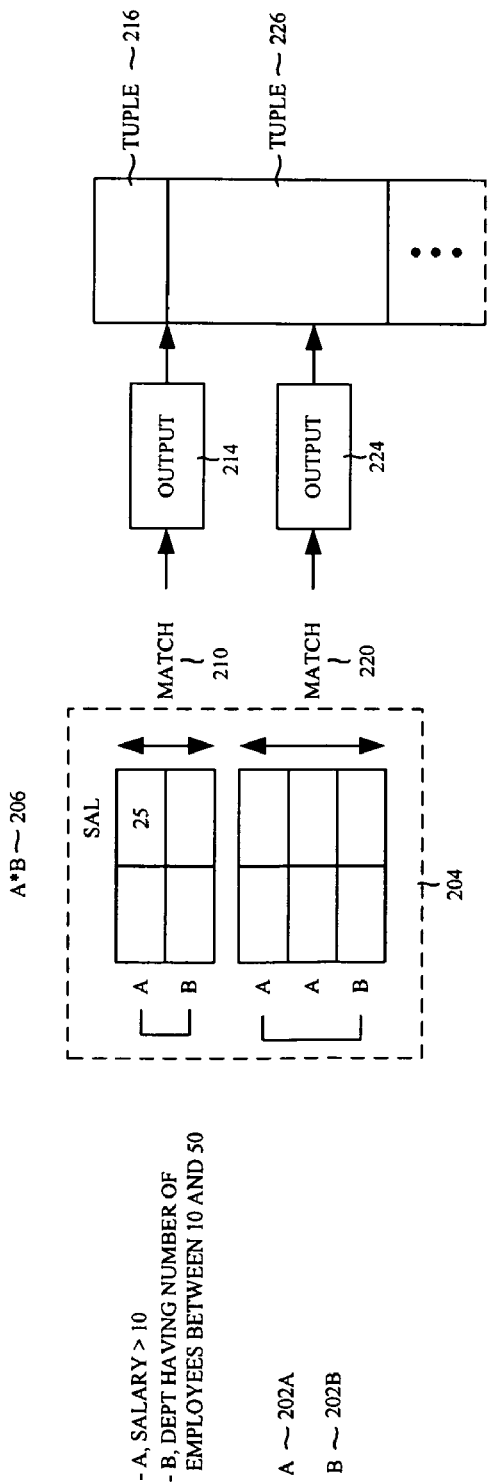
FIG. 2 is an example view that illustrates generation of the output based on matching of an ordered data (e.g., A and B) with a certain pattern (For example, A*B in 206) in the relational database, according to one embodiment.

FIG. 2 is an example view that illustrates generation of the output 114 based on matching of an ordered data (e.g., A and B) with a certain pattern (e.g., A*B 206) in the relational database, according to one embodiment. In particular, FIG. 2 illustrates symbols 202A-B, ordered data with symbols 204, a pattern 206, matches 210 and 220, outputs 214 and 224 and tuples 216, and 226, according to one embodiment.

In an example embodiment, symbols 'A' and 'B' may be generated. The symbols 'A' may represent the symbol 202A and the symbol 'B' may represent the symbol 202B. The generated symbols 202A-B may be applied to a specific ordered data. In the example embodiment, the symbol A 202 may be applied to the ordered data 'salary >10'. The symbol B may be applied to the ordered data 'department having number of employees between 10 and 50'. The pattern 'A*B' 206 may be applied to the ordered data with symbols 204. Furthermore, the match 210 and 220 may be performed between the pattern 206 and the ordered data with symbols 204. The output aggregation may be applied to the result of the match (e.g., the match 210 and the match 220) and the output (e.g., the output 214 and the output 224) may be generated. The generated output 214 and 224 may be stored in the tuple 216 and tuple 226 respectively.

Figure 3:
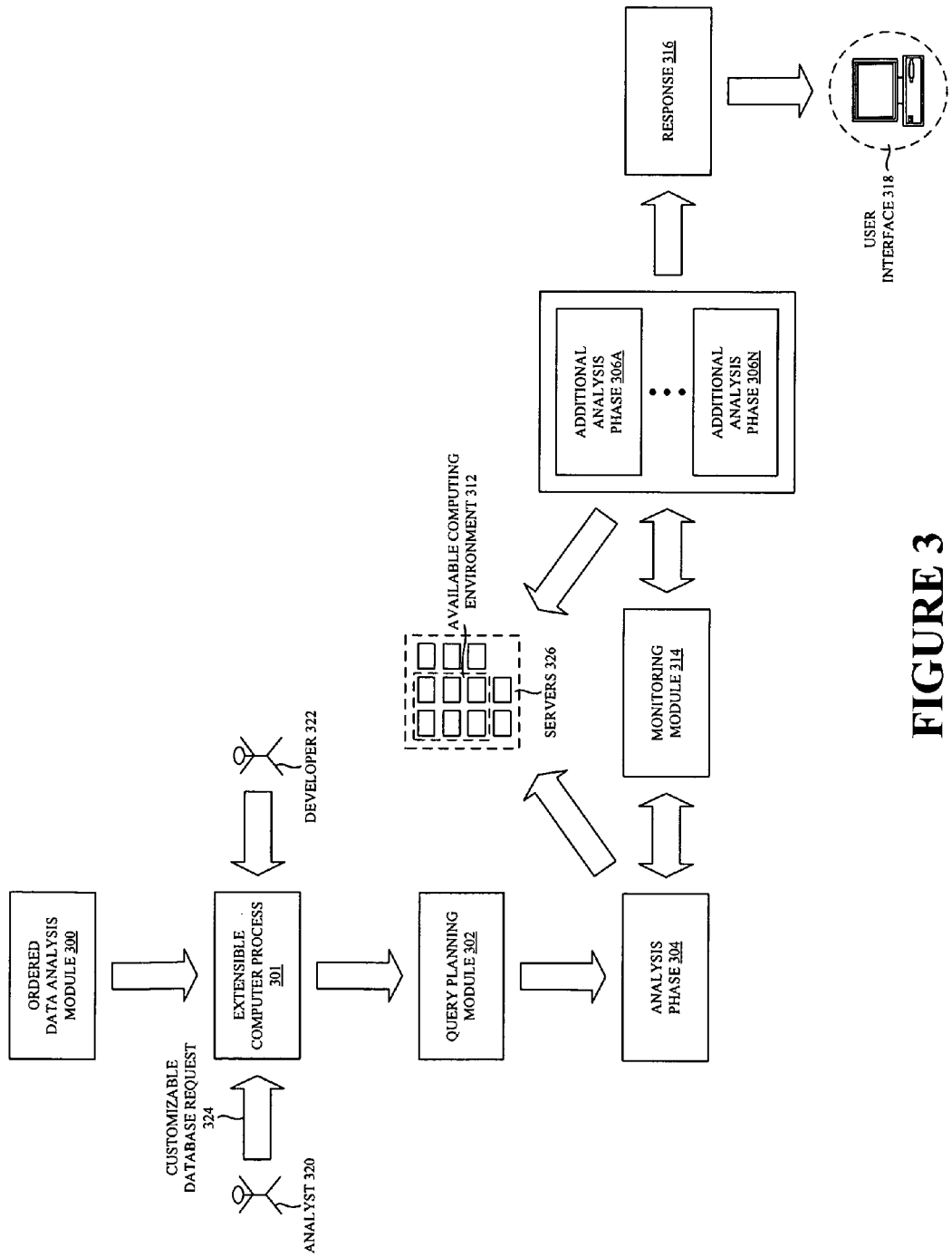
FIG. 3 is a system view illustrating processing of a customizable database query using a developer extensible operation and an available computing environment, according to one embodiment.

FIG. 3 is a system view illustrating processing of a customizable database query using a developer extensible operation and an available computing environment, according to one embodiment. In particular, FIG. 3 illustrates an ordered data analysis module 300, an extensible computer process 301, a query planning module 302, an analysis phase 304, an additional analysis phase 306A-N, an available computing environment 312, a monitoring module 314, a response 316, a user interface 318, an analyst 320, a developer 322, a customizable database request 324, and servers 326, according to one embodiment.

FIG. 3 illustrates an analyst 320 providing a customizable database request 324 to the extensible computer process 301. The analyst 320 may be a database analyst who is familiar with SQL (e.g., a Structured Query Language). SQL may be a database computer language designed for the retrieval and management of data in relational database management systems (RDBMS), database schema creation and modification, and database object access control management. The analyst 320 may have limited knowledge of other programming languages, and may have a substantially limited ability to create programs, to modify software, and to manage software distributed across multiple processors. The analyst 320 may be tasked with searching for data rather than developing programs.

The customizable database request 324 may consist of a SQL instruction and/or it may be written in any query language. The customizable database request 324 may be customized to include a function (e.g., a nested SQL command, a mathematical equation, a variable, a standard deviation, etc.). The function may be created by the analyst 320, the developer 322, and/or it may be a predefined system function. The function may be customized to search multiple records at once, to retrieve and/or manipulate data in multiple forms (e.g., tables, images, unstructured data 784, text files, programs, sound files, photos, etc.). The function may access data in one form and generate data in another form. The customizable database request 324 may further specify an input data 710 for the extensible computer process 301.

The customizable database request 324 may allow the process to be scaled in accordance with a changing system hardware and/or performance of a system. The function may allow user-implemented procedural code to be uploaded to a database and executed at each node of a system. A user (e.g., an analyst 320, a developer 322, etc.) may provide code that may operate on individual rows and/or on groups of rows. The customizable database request 324 may take in input using a set of rows in a table (e.g., a persistent table in a database, the output of a SQL SELECT statement and/or the output of another function, etc.). The customizable database request 324 may result in an output that includes a relation of a set of rows (e.g., an output.) The customizable database request 324 and/or a function of the customizable database request 324 may be placed into a SQL SELECT query and/or any other query as though it were itself a table. This integration with SQL may allow for composing SQL and procedural code invocations in any form and shape. The code may be written in Java, Python, and/or any other language.

In an embodiment, the customizable database request 324 may include a function that is written in Java that is then invoked as part of a SQL query statement. The function may convert sets of rows to sets of rows. The function may be parallelized to operate on rows across multiple nodes simultaneously. The function may be invoked on arbitrary sets of rows and/or rows grouped together by a PARTITION BY clause. Within a partition, rows may be further sorted using an ORDER BY clause.

In an embodiment, a function may split strings into words. In the embodiment, the function may be invoked once for every row in an input table. The function may include Java procedural code that takes each document and emits a row for each word. The function may define a column that appears in its output rows. In another embodiment, a function may be created to compute the 10 most-frequently occurring words in a body of text using the function to split strings into words.

In yet another embodiment, a function of the customizable database request 324 may perform sessionization by mapping each click in a clickstream to a unique session identifier. The function may define a session as a sequence of clicks by a particular user where no more than n seconds pass between successive clicks, e.g., if a click from a user isn't seen for n seconds, a new session is started. The function may use a userid and/or a timestamp attribute. The function may include as parameters the name of the timestamp attribute, the number of seconds between clicks that results in starting a new session. A clickstream table may be partitioned by userid, and partition tuples may be sequenced by timestamp. The sessionize function may then be invoked against each of the ordered partitions and/or emit the input tuples with an appropriate sessionid added.

The customizable database request 324 may be received by an extensible computer process 301, which may be designed to take into consideration future growth by allowing the addition and/or modification of functionality. The addition of new functionality and/or the modification of existing functionality may be accomplished with limited impact to existing system functions. A developer 322 may be familiar with a type of programming involving database analysis, query modification, and/or data searches. The developer 322 may possess limited knowledge regarding programs to distribute an analysis across multiple computing systems. The developer 322 may support and/or design software for the analyst 320. The developer 322 may adapt the extensible computer process 301 to add new functions, modify existing functions, and/or add additional language ability to the software.

The extensible computer process 301 may communicate with a query planning module 302 to generate a query interpretation of the customizable database request 324. The query interpretation may be formatted to be distributable (e.g., separated into individual tasks for separate processes, etc.). The query interpretation may convert the customizable database request 324 from any computer language (e.g., a machine-readable artificial language designed to express computations that can be performed by a machine, C++, SQL, Perl, Java, Prolog, etc.) into a preferred programming language. The query interpretation may automatically format the customizable database query to be processed using a distributable and/or multiphase analysis.

The query planning module 302 may generate an interpretation (e.g., the query interpretation) of the customizable database request, which may include an extensible computer process 301. The query planning module 302 may optimize the analysis phase and/or the additional analysis phase using a parameter (e.g., an expected output file size, an input file format, a table dimension, etc.). The query planning module may provide an input guidance to available processors of the available computing environment. The input guidance may include certain portions of the input data, and the input guidance may be used to determine which of the available processors are to perform functions related to different parts of the input data.

The query planning module 302 may use a parameter to allocate a system resource (e.g., memory, power supply output, processor usage, a number of servers applied, a sequence of processors used, a timing of processes analyzed, etc.). The allocation of a system resource may include a distribution of processes across an available computing environment 312, a selection of a type of analysis to apply, and/or a selection of input data to review. The execution of the interpretation may be automatically distributed across an available computing environment operating concurrently and in a parallel clustered environment, and a component of the execution may be limited to a part of the input data. The parallel clustered environment may be comprised of at least two processing nodes operating concurrently and in parallel. The part of the input data may be a subset of the input data, which may allow the execution to be divided into separate tasks to be processed by different machines.

The available computing environment 312 (e.g., networked processors, virtual machines, multiple processors of a server, multiple servers 326A-N, etc.) may comprise of servers that are and/or will be available to process data. The available computing environment 312 may be better illustrated in FIG. 5.

The query interpretation may be dynamically determined based on a context (e.g., a repeated pattern of requested information, an association between an analyst's customizable database request 324 and an input data 710, etc.). The context of the customizable database request 324 may include the type of requested information, the language of the request, and/or the expected response 316. For example, if the analyst's request includes a name and address, the analysis phase 304 and/or the additional analysis phase 306A-N may be adjusted to provide a response 316 that includes GPS coordinates (e.g., latitude and/or longitude, etc.). In another embodiment, the query interpretation may automatically provide alternate responses based on a variation of the requested parameters, such as by expanding or contracting a search parameter to provide alternate responses, varying search parameters, and searching for peak values.

The interpretation of the customizable database request 324 generated by the query planning module 302 may be processed based on contextual information provided to the extensible computer process 301. The extensible computer process 301 may be a developer provided-computer program. The information provided may include a format of the input data and the output data, whether the input data and the output data are ordered and in which form, grouping information, statistics of the input data and the output data, a distribution information, a length of the input data and the output data, and a custom parameter.

The custom parameter may be a number, a string, and/or a list of numbers of strings. The custom parameter may further include a content of a file in the available computing environment 312, and/or a result of the customizable database request 324 (e.g., the response 316). The query interpretation generated by the query planning module 302 may be communicated to an analysis phase 304, which may be automatically distributed across the available computing environment 312. The automatic distribution of the query interpretation may allow separate machines to analyze the query using portions of an input data 710 simultaneously, in parallel, in an overlapping sequence, and/or in series.

The analysis phase 304 may include a component that is limited to a part of the input data 710. The component may process a part of a "map" phase of a MapReduce analysis (e.g., a framework for computing a distributable problem). The component may process a part of the analysis phase 304 using its part of the input data 710. The analysis phase 304 may also include an additional component that uses the output of the component to generate an additional output (e.g., the additional component operates in series with the component, the additional component uses the output of the component as one of several inputs, etc.).

Figure 5:
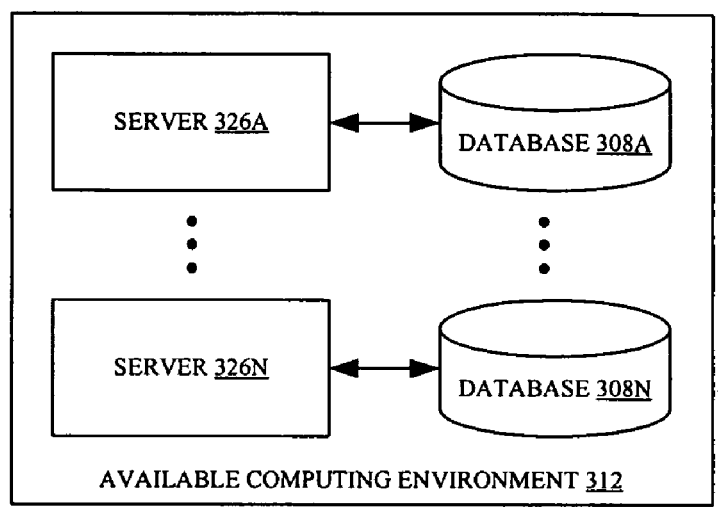
FIG. 5 is an exploded view of the available computing environment 312 illustrated in FIG. 3, according to one embodiment.
Figure 7:
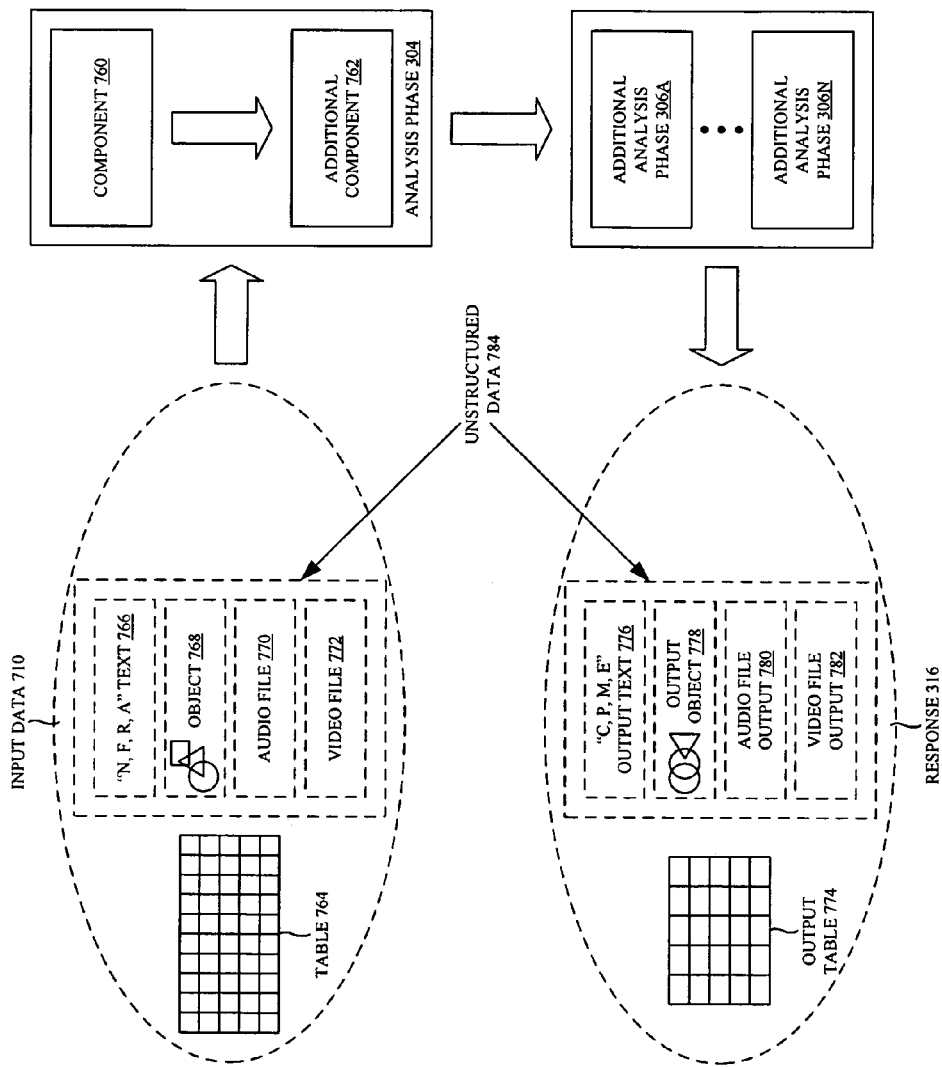
FIG. 7 is an illustration of processing input data to generate a query response, according to another embodiment.

The analysis phase 304 may process the query interpretation using the input data 710, which may be acquired from the database 308A-N in FIG. 5. The input data 710 may include structured data and/or unstructured data 784, as illustrated in FIG. 7. The input data 710 of the analysis phase 304 may be generated using a combination of multiple data sources (e.g., multiple tables, storage devices, etc.). The portion of the input data 710 used by a component of the analysis phase 304 may also be generated using a combination of multiple data sources.

The analysis phase 304 may communicate with a monitoring module 314 and/or the additional analysis phase 306A-N, which may be automatically distributed across the available computing environment 312 (e.g., currently available servers, virtual machines, processors, etc.). The additional analysis phase 306A-N may access a greater amount of information that the amount of the input data 710 used by the analysis phase 304. The additional analysis phase 306A-N may operate in parallel, in series, or in any other pattern with the analysis phase 304.

The response 316 may be automatically assembled using a distributed output of the additional analysis phase 306A-N. The output of the additional analysis phase 306A-N may be distributed across multiple processors, servers, and/or virtual machines and a complete resulting output may require an accumulation of all distributed parts of the additional analysis phase 306A-N output. The assembled output may be the response 316. The response 316 may be displayed through a user interface (e.g., a web browser, a terminal, a PC, a server, a monitor, etc.).

The monitoring module 314 may observe the input data 710 provided to the analysis phase 304, the available computing environment 312, the input to the additional analysis phase 306A-N, the processing of information by the additional analysis phase 306A-N, and the assembled response 316. The monitoring module 314 may manage the automatic distribution of the analysis phase 304 and/or the additional analysis phase 306A-N across the available computing environment 312. The monitoring module 314 may assemble the distributed output of the additional analysis phase 306A-N to generate the response 316.

The monitoring module 314 may detect a fault (e.g., an exception, a hardware failure, a system crash, a processor failure, a data error, a processing error, etc.) in the analysis phase 304 and/or the additional analysis phase 306A-N. The monitoring module 314 may automatically rectify an output effect (e.g., a data corruption, a propagating data error, a system failure, etc.) of the fault. The rectification may include one or more of reprocessing an operation (e.g., a component of the analysis phase 304, the additional analysis phase 306A-N, etc.), excluding a corrupted data, and/or logging a corrupted data. The rectification may include isolating a fault generating process and/or hardware mechanism. The monitoring module 314 may rectify an output effect automatically.

Figure 4:
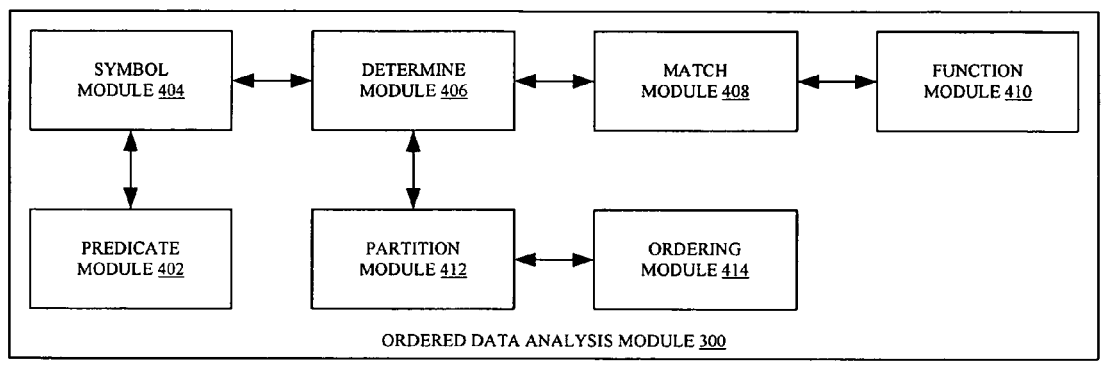
FIG. 4 is an exploded view of the ordered data analysis module of FIG. 3, according to one embodiment.

FIG. 4 is an exploded view of the ordered data analysis module 300 illustrated in FIG. 3, according to one embodiment. Particularly, FIG. 4 illustrates the ordered data analysis module 300, a predicate module 402, a symbol module 404, a determine module 406, a match module 408, a function module 410, a partition module 412, an ordering module 414, according to one embodiment.

The predicate module 402 may be a function that enables the symbol module 404 to assign a symbol to a certain tuple in an ordered data (e.g., that may be partitioned using the partition module 412). The predicate module 402 may be communicatively coupled to the symbol module 404. The symbol module 404 may generate and assign a symbol to a certain tuple in an ordered data based on the predicate of the predicate module 402. Every symbol may be assigned a predicate value. The determine module 406 to determine which sequence of symbols in the ordered data from the partition module 412 matches a query. In addition, the determine module 406 may determine the ordered data through the partitioning of the ordered data 102 (e.g., using the partition module 412) and the ordering (e.g., using the ordering module 414) of the one or more group to form a sequence. Furthermore, the determine module 406 may determine the match of the pattern in the single pass in constant space for overlapping mode of results to the ordered data based on the predicate value assigned to each symbol responsive to the query.

The determine module 406 module may be communicatively coupled to the partition module 412. The partition module 412 may partition the ordered data 102 into one or more groups of data. The partition module 412 may be communicatively coupled to the ordering module 414. The ordering module 414 may order one or more groups of data to form a sequence. The determine module 406 may also be communicatively coupled to the symbol module 404 and the match module 408. The match module 408 may match the sequence of symbols in the ordered data of the partition module 412 to the query in a single pass in constant space for overlapping mode of results or multiple passes. The single pass may be a solitary, unidirectional application of a matching algorithm against the ordered data. The query may be one or more of a non-sequential query and an undefined interval query. The match module 408 may be communicatively coupled to the function module 410. The function module 410 may apply a function to determine an output in the single pass in constant space for overlapping mode of results based on the match between the sequence of symbols in the ordered data of the partition module 412 and the query. The function may be one or more of an aggregation function, a count function, an average function, and a frequency function.

FIG. 5 is an exploded view of the available computing environment 312 illustrated in FIG. 3, according to one embodiment. In particular, FIG. 5 illustrates the available computing environment 312, the multiple servers 326A-N, and the databases 308A-N, according to one embodiment. The available computing environment 312 may include one or more servers that are currently or will be open to process information within a preferred time frame. The server set 326A-N of the available computing environment 312 may be comprised of one or more separate servers, virtual machines, client devices, and/or separate processors of a single server. The servers 326A-N may communicate with one or more databases (e.g., databases 308A-N), which may be included within the available computing environment 312. The servers 326A-N and the databases 308A-N may communicate with each other via a LAN, a WAN, a MAN, and/or any other network arrangement. In addition, the databases 308A-N may include direct attached storage devices, volatile and/or non-volatile memory.

Figure 6:
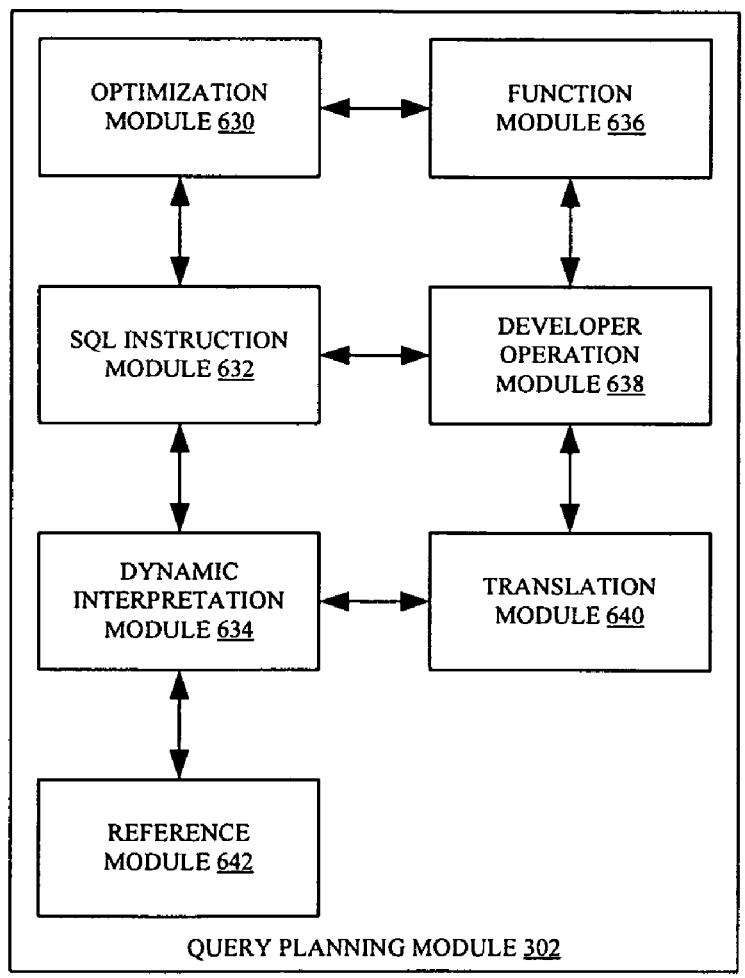
FIG. 6 is an exploded view of the query planning module, according to one embodiment.

FIG. 6 is an exploded view of the query planning module 302, according to one embodiment. In particular, FIG. 6 includes the query planning module 302, an optimization module 630, a SQL instruction module 632, a dynamic interpretation module 634, a function module 636, a developer operation module 638, a translation module 640, and a reference module 642.

The query planning module 302 may include multiple modules to perform various functions. For example, the optimization module 630 may optimize the analysis phase 304 and/or the additional analysis phase 306A-N using a parameter included with the customizable data request. The parameter may include a prediction and/or expectation regarding the response 316 (e.g., an output memory requirement, a number of generated responses, a range of response outputs, a type of input data, etc.). The SQL instruction module 632 may interpret a SQL command, a nested SQL instruction, etc.

The function module 636 may alter the query interpretation based on a function (e.g., a predefined function, an analyst and/or developer created function, etc.). The function may be an equation, a programming command, a sequence of commands, etc. The developer operation module 638 may generate the query interpretation based on an operation added and/or modified by a developer in the extensible computer process 301. The translation module 640 may generate the query interpretation by translating the customizable database request 324 from any language (e.g., a computer programming language such as SQL, Java, dBase, and/or a human language such as Indonesian, Russian, Spanish, and/or Chinese). The reference module 642 may provide an extensible computer process 301 information about its context in the database request.

FIG. 7 is an illustration of processing input data to generate a query response, according to another embodiment. In particular, FIG. 7 illustrates the analysis phase 304, the additional analysis phase 306A-N, the input data 710, the response 316, a component 760, an additional component 762, an input table 764, text 766, an object 768, an audio file 770, a video file 772, an output table 774, an output text 776, an output object 778, an audio file 780, an output video file 782, and an unstructured data 784.

FIG. 7 illustrates a variety of types and forms that may be taken by the input data 710 and/or the response 316. The input data 710 may include the table 764, the text 766, the object 768, the audio file 770, and/or the video file 772. The input data 710 may be structured in a form including a database table and/or an output of a different database query. The response 316 may include the output table 774, the output text 776, the output object 778, the output audio file 780, and/or the output video file 782. The table 764 and/or the output table 774 may be structured data. The text 766, the object 768, the audio file 770, the video file 772, the output text 776, the output object 778, the output audio file 780, and/or the output video file 782 may be unstructured data 784. The input data 710 may be unstructured in a form including a content of at least one file in a computing environment. The unstructured data 784 may include a mix of data types, including images and audio files, text, programs, and/or word processing files.

The input data 710 may be communicated to the analysis phase 304, which may process the data in the component 760 and/or the additional component 762. The output of the analysis phase 304 may be received by the additional analysis phase 306A-N, which may generate the response 316. The additional analysis phase 306A-N may consist of one or more phases. The response 316 may be formed of the same and/or a different data type from the input data 710.

Figure 8:
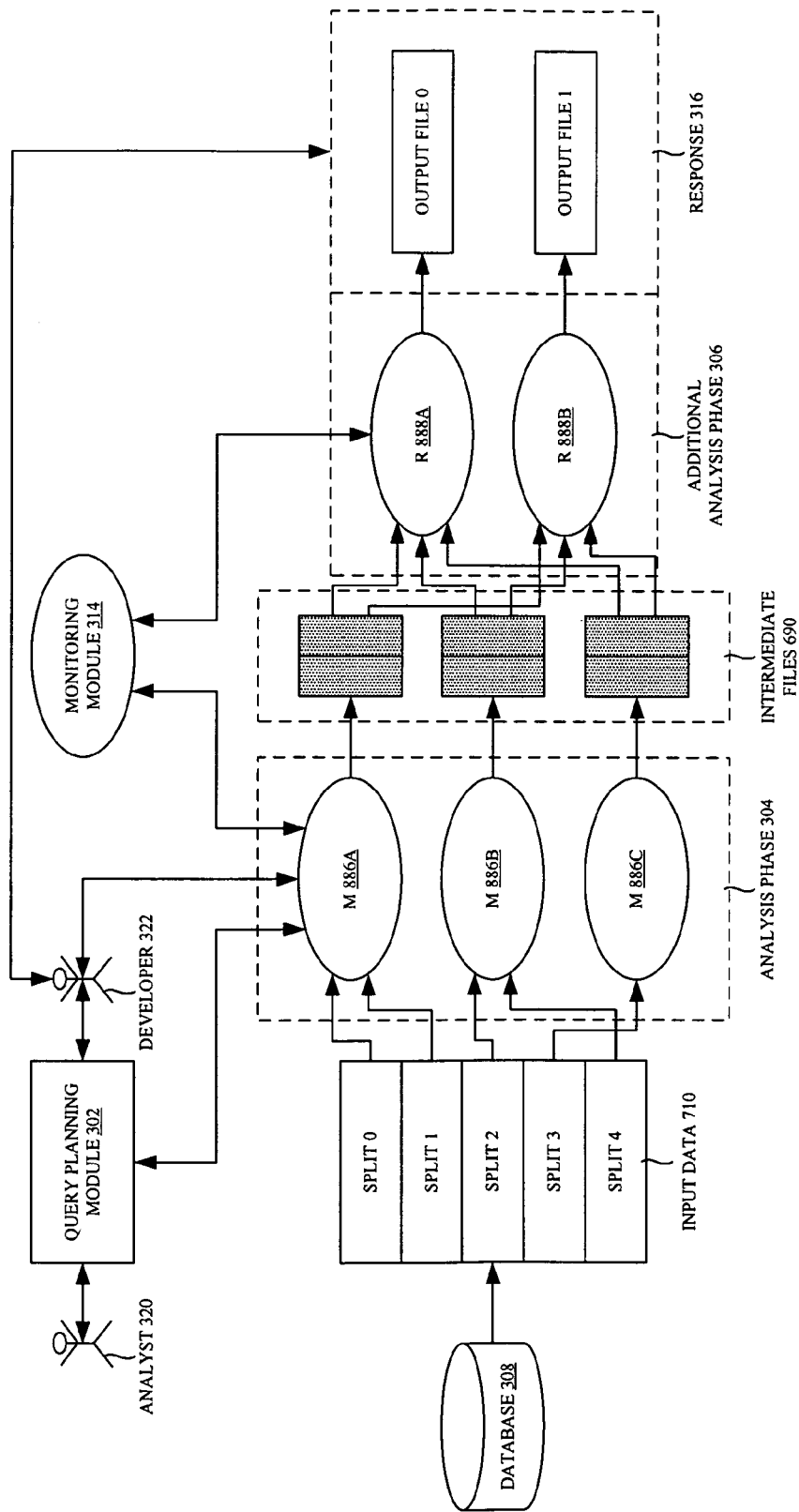
FIG. 8 is a system view of an alternate embodiment of processing of a customizable database query using a developer extensible operation and the available computing environment 312.

FIG. 8 is a system view of an alternate embodiment of processing of a customizable database query using a developer extensible operation and the available computing environment 312. In particular, FIG. 8 illustrates the query planning module 302, the analysis phase 304, the additional analysis phase 306, the database 308, the input data 710, the monitoring module 314, the response 316, the analyst 320, the developer 322, mapping modules M 886A-C, reduce modules R 888A-B, and intermediate files 690.

The query planning module 302 may receive a customizable database request 324 from the analyst 320. The developer 322 may contribute to and/or modify the customizable database request 324. The query planning module 302 may communicate a query interpretation to the analysis phase 304. The analysis phase 304 may receive an input data 710 from the database 308. The input data 710 may be divided into split 0-4. The analysis phase 304 may include multiple mapping components M 886A-C. The additional analysis phase 306 may include the reduce components R 888A-B. The M 886A-C may each represent a map operation performed on a limited data input (e.g., split 0 and 1, split 2 and 4, split 3, etc.). The M 886A-C may generate intermediate files 690, which may be communicated to the additional analysis phase 306. The R 888A-B may represent reduce operations in which the output of the map phases are accessible by each of the reduce operations. The R 888A-B of the additional analysis phase 306 may produce output file 0-1 (e.g., the response 316).

Figure 9:
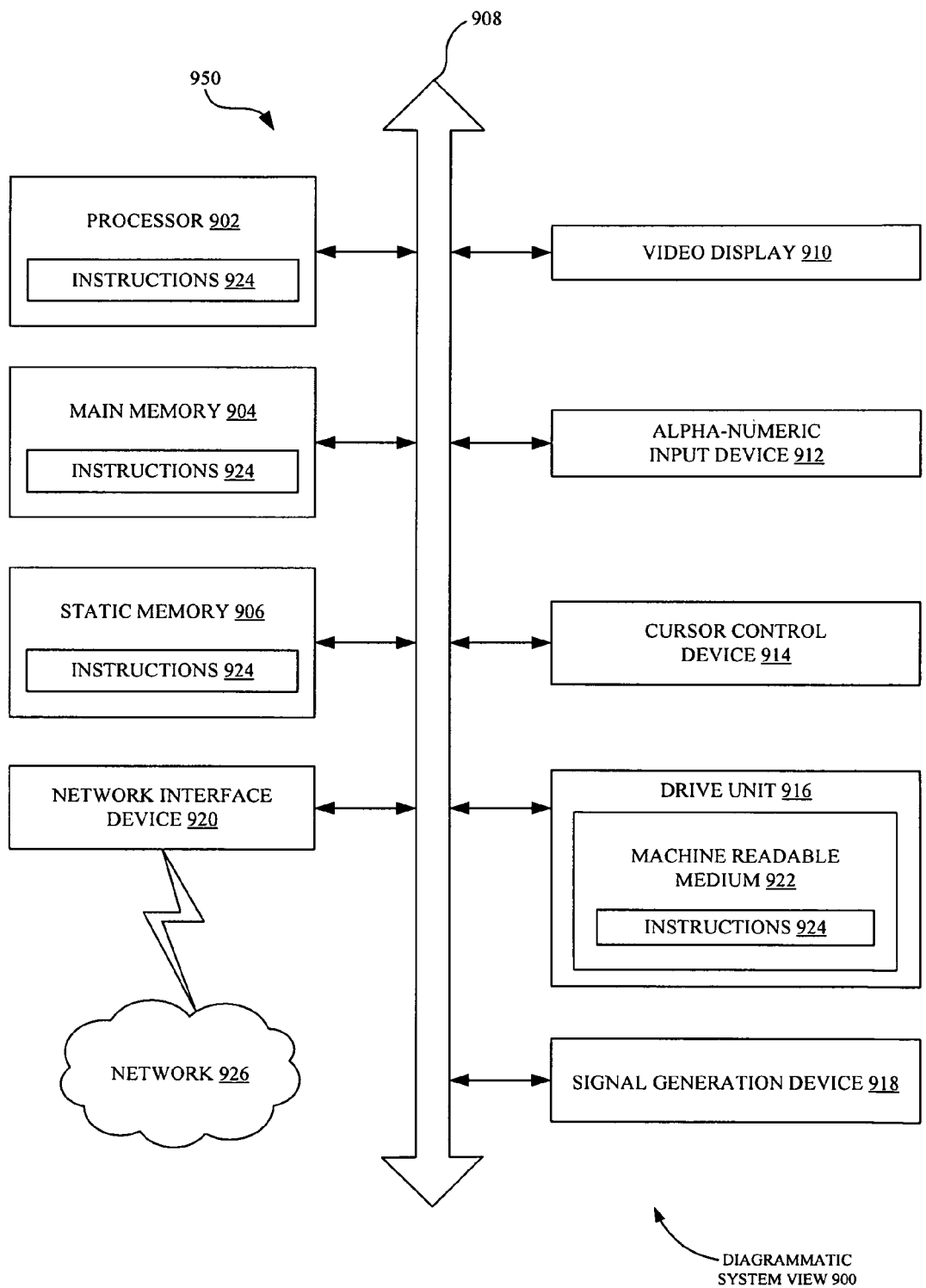
FIG. 9 is a diagrammatic system view of a data processing system in which any of the embodiments disclosed herein may be performed, according to one embodiment.

FIG. 9 is a diagrammatic system view of a data processing system in which any of the embodiments disclosed herein may be performed, according to one embodiment. Particularly, the diagrammatic system view 900 of FIG. 9 illustrates a processor 902, a main memory 904, a static memory 906, a bus 908, a video display 910, an alpha-numeric input device 912, a cursor control device 914, a drive unit 916, a signal generation device 918, a network interface device 920, a machine readable medium 922, instructions 924, and a network 926, according to one embodiment.

The diagrammatic system view 900 may indicate a personal computer and/or the data processing system in which one or more operations disclosed herein are performed. The processor 902 may be a microprocessor, a state machine, an application specific integrated circuit, a field programmable gate array, etc. (e.g., Intel® Pentium® processor). The main memory 904 may be a dynamic random access memory and/or a primary memory of a computer system.

The static memory 906 may be a hard drive, a flash drive, and/or other memory device associated with the data processing system. The bus 908 may be an interconnection between various circuits and/or structures of the data processing system. The video display 910 may provide graphical representation of information on the data processing system. The alpha-numeric input device 912 may be a keypad, a keyboard and/or any other input device of text (e.g., a special device to aid the physically handicapped).

The cursor control device 914 may be a pointing device such as a mouse. The drive unit 916 may be the hard drive, a storage system, and/or other longer term storage subsystem. The signal generation device 918 may be a bios and/or a functional operating system of the data processing system. The network interface device 920 may be a device that performs interface functions such as code conversion, protocol conversion and/or buffering required for communication to and from the network 926. The machine readable medium 922 may provide instructions on which any of the methods disclosed herein may be performed. The instructions 924 may provide source code and/or data code to the processor 902 to enable any one or more operations disclosed herein.

Figure 10A:
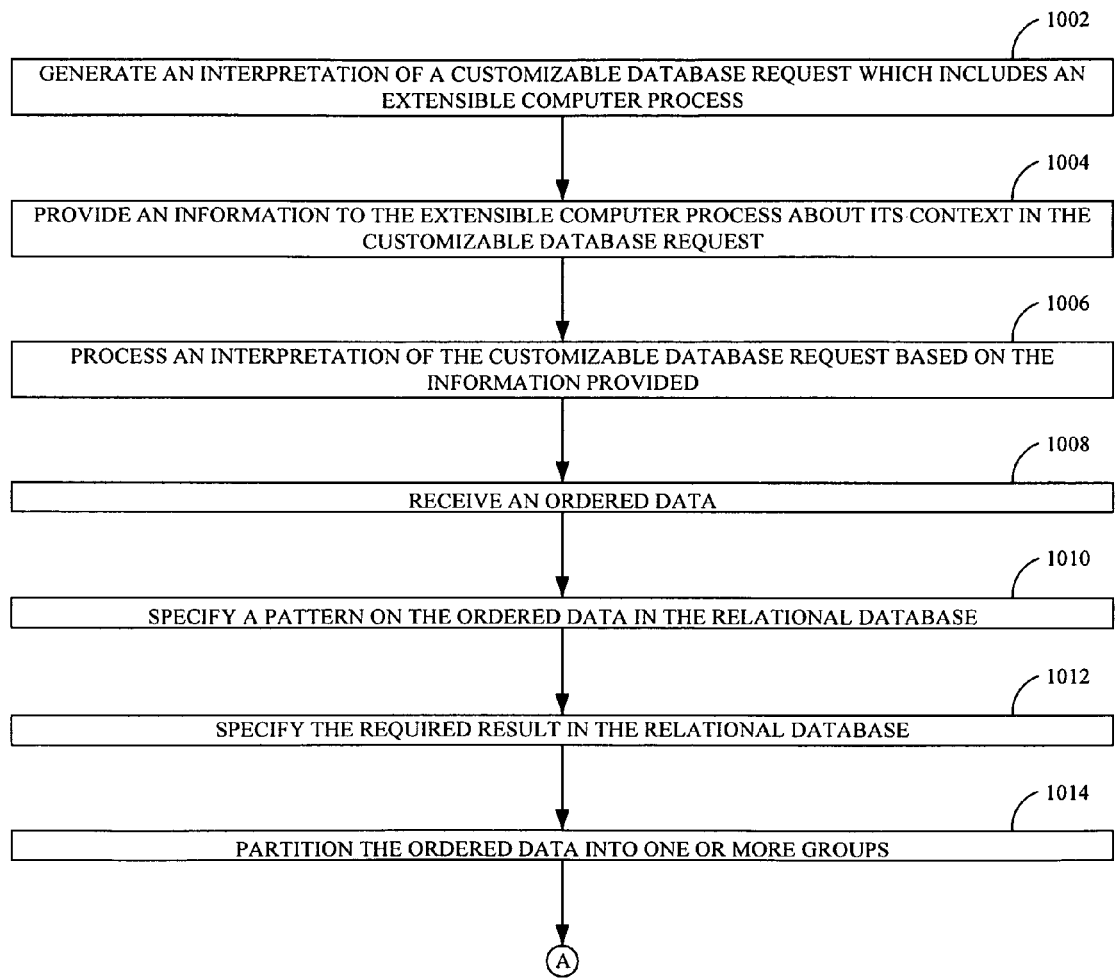
FIG. 10A is process flow that illustrates functions of a server, according to one embodiment.

FIG. 10A is process flow that illustrates functions of a server, according to one embodiment. In operation 1002, an interpretation of the customizable database request 324 may be generated which includes an extensible computer process 301. In operation 1004, information may be provided to the extensible computer process 301 about its context in the customizable database request 324. In operation 1006, an interpretation of the customizable database request 324 may be processed based on the information provided. In operation 1008, the input data may be received. In operation 1010, a pattern of the ordered data 102 may be specified in the relational database. In operation 1012, the required result may be specified in the relational database. In operation 1014, the input data may be partitioned into one or more groups. For example, the partition module 412 may be used to partition the ordered data 102.

Figure 10B:
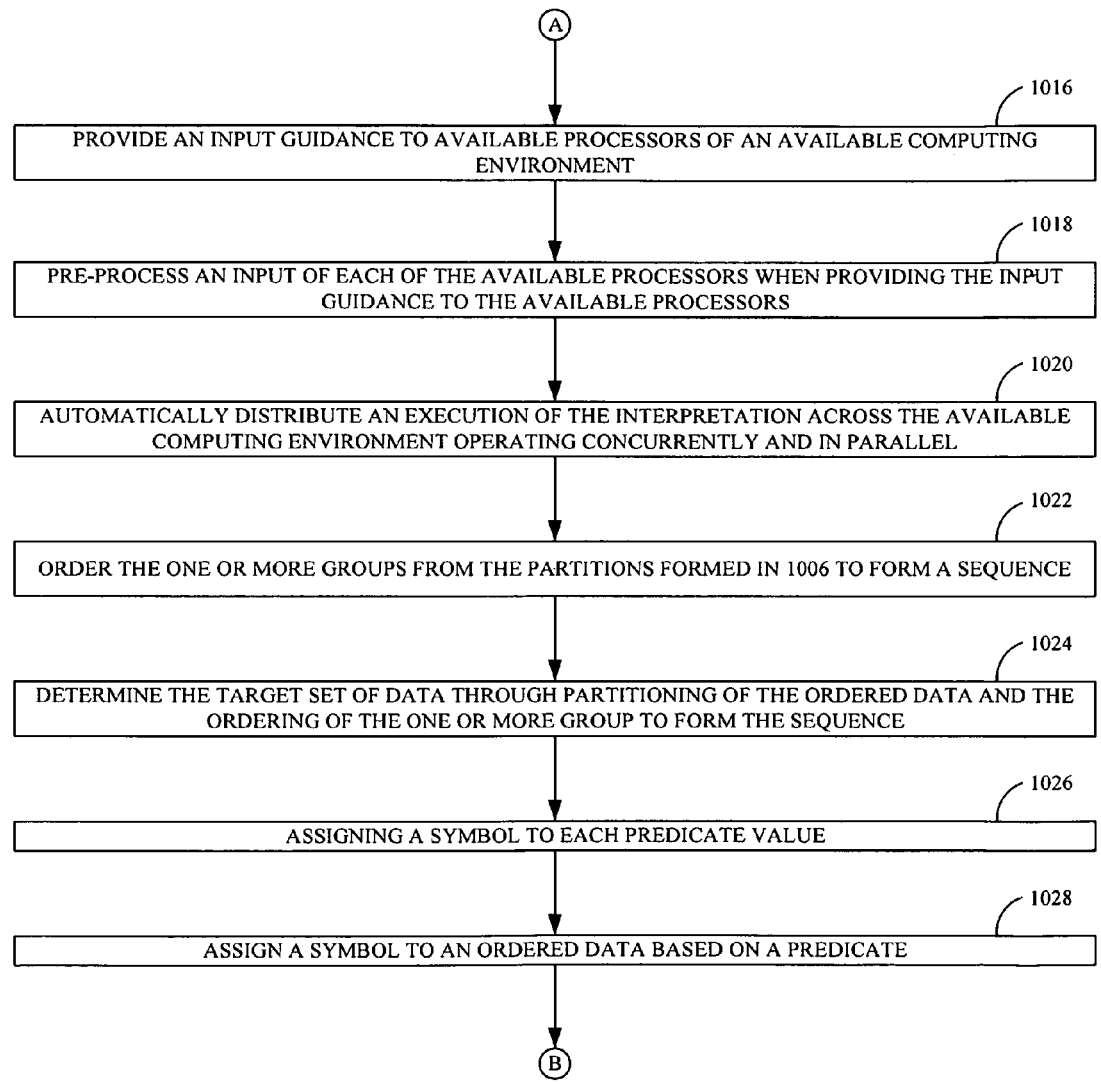
FIG. 10B is a continuation of the process flow illustrated in FIG. 10A illustrating additional operations, according to one embodiment.

FIG. 10B is a continuation of the process flow illustrated in FIG. 10A illustrating additional operations, according to one embodiment. In operation 1016, an input guidance may be provided to available processors of an available computing environment. In operation 1018, an input of each of the available processors may be pre-processed when providing the input guidance to the available processors. In operation 1020, an execution of the interpretation may be automatically distributed across the available computing environment 312 operating concurrently and in a parallel clustered environment. The parallel clustered environment may be comprised of at least two processing nodes operating concurrently and in parallel. In operation 1022, one or more groups from the partitions formed in 1006 may be ordered to form a sequence. For example, the ordering module 414 may be used to form a sequence. In operation 1024, a target set of may be determined through the partitioning of the ordered data and the ordering of the one or more group to form the sequence. In operation 1026, a symbol may be assigned to each predicate value. In operation 1028, a symbol may be assigned to an ordered data based on a predicate. For example, the symbol module 404 may be used to assign a symbol to a certain tuple.

Figure 10C:
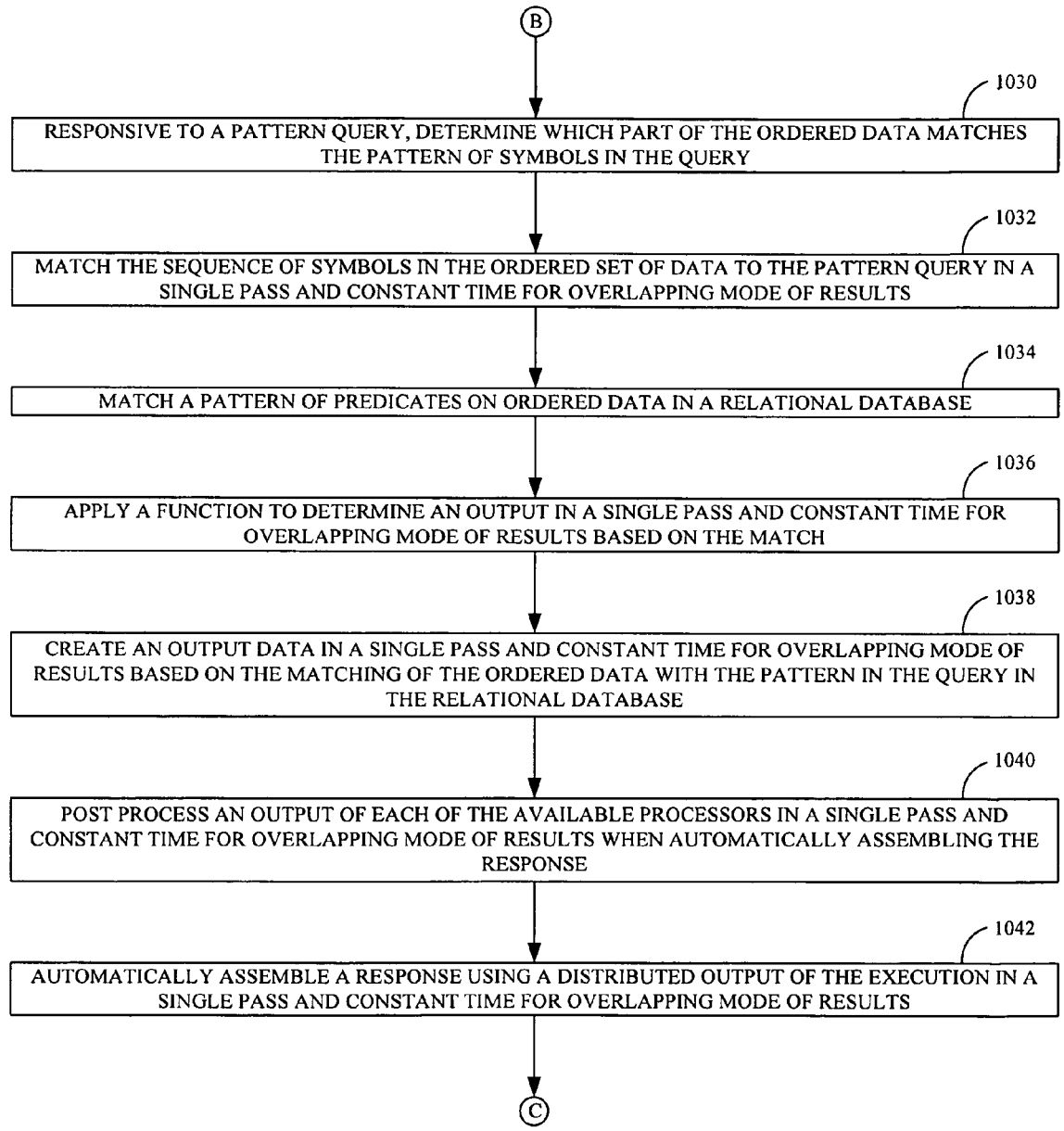
FIG. 10C is a continuation of the process flow illustrated in FIG. 10B illustrating additional operations, according to one embodiment.

FIG. 10C is a continuation of the process flow illustrated in FIG. 10B illustrating additional operations, according to one embodiment. In operation 1030, responsive to a pattern query, a part of the ordered data that matches the sequence of symbols may be determined in a single pass and constant space for overlapping mode of results. For example, the determine module 406 may be used to determine symbols in the ordered data which match the query. In operation 1032, the sequences of symbols may be matched in the ordered data to the pattern query in a single pass and constant time for overlapping mode of results based on the match. For example, the match module 408 may be used to match the pattern 108 of symbols to the query. In operation 1034, a pattern may be matched on ordered data in a relational database. In operation 1036, a function may be applied to determine an output in a single pass and constant time for overlapping mode of results based on the match. For example, the function module 410 may be used to apply a function. In operation 1038, the output data 104 may be created in a single pass and constant time for overlapping mode of results based on the matching of the ordered data with the pattern 108 in the relational database. In operation 1040, an output of each of the available processors may be post processed in a single pass and constant time for overlapping mode of results when automatically assembling the response. In operation 1042, a response may be automatically assembled using a distributed output of the execution in a single pass in constant time for overlapping mode of results. The operations illustrated above may be enabled using FIG. 1 and FIG. 3.

Figure 10D:
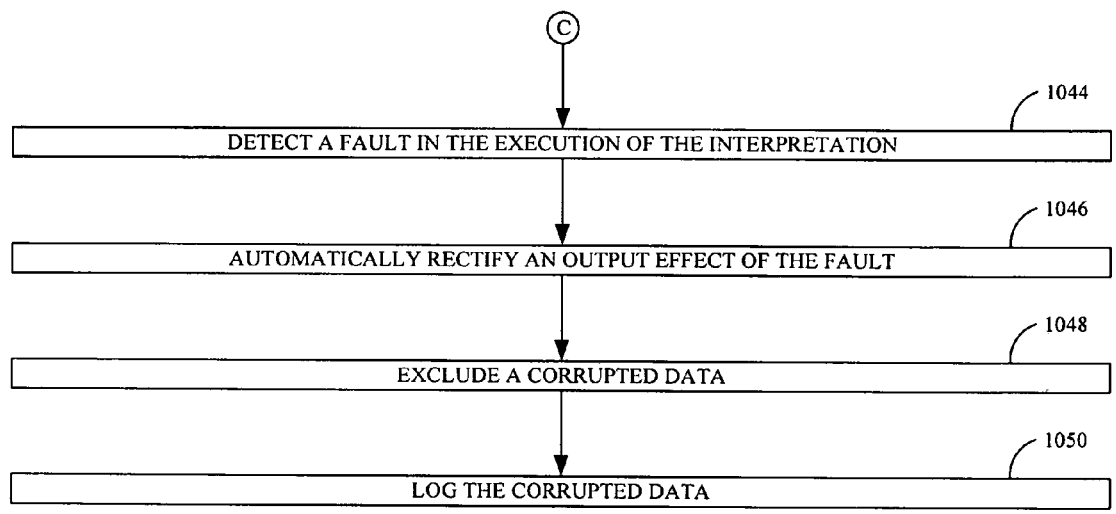
FIG. 10D is a continuation of the process flow illustrated in FIG. 10D illustrating additional operations, according to one embodiment.

FIG. 10D is a continuation of the process flow illustrated in FIG. 10D illustrating additional operations, according to one embodiment. In operation 1044, a fault may be detected in the execution of the interpretation. In operation 1046, an output effect may be automatically rectified of the fault. In operation 1048, a corrupted data may be excluded. In operation 1050, the corrupted data may be logged.

As an example, the following text is provided to enhance understanding of the present embodiments. However, the following text is merely an example of one way to achieve the various claims and should not be treated as limitations to the claims.

A Pattern

A pattern may be an expression comprising of the following: Symbols: A symbol may be a placeholder for a tuple in the tuple sequence. In this document, we use A, B, C, . . . as symbols. Symbol predicates: Each symbol may be optionally associated with a predicate; a symbol can match a tuple only if the tuple satisfies the symbol's predicate. A symbol not associated with a predicate can be thought of as associated with the predicate "true", meaning that the symbol can match any tuple. Note that the predicates for different symbols may overlap, and therefore multiple symbols may match one tuple. Operators:

"˙": cascade

"|" alternative

"?": occurs at most once

"*": occurs zero or more times

"+": occurs at least once Precedence: "."<"|"<"?"="*"="+"
Operators with equal precedence associate left to right.
Parenthesis: Patterns can be nested using parentheses "("and")".
Anchors: The special characters "^" and "$" are placeholders for the start and the end of the sequence respectively. "^" only makes sense at the start of a pattern, and "$" only makes sense at the end of a pattern.

A Pattern Match

Let P be the given pattern, and let S be the set of symbols appearing in P, with each s in S associated with a predicate p_s. We say that the pattern P matches the sequence at tuple t in the input sequence iff there exists a pair (Tt, Mt) such that:
Tt is a contiguous subsequence of tuples starting at t: t0=t, t1, t2, . . . , tk
for some k>=0
Mt is a mapping from the tuples in Tt to the symbols in S such that each tuple u in Tt satisfies the predicate p_{Mt(u)}
the string Mt(t0).Mt(t1) . . . Mt(tk) is in the set of strings defined by P Note that, as defined, Tt and Mt might not be unique for a tuple t. In fact, it is easy to develop a scenario wherein there exist an exponential number of Tt, Mt pairs at each t. To make the computation tractable, we impose the following constraint:

If there exist multiple candidate subsequences for Tt, we pick the longest. This constraint is common in regular expression matching implementations (in text editors, for instance) and is known variously as "greedy", "maximal munch", etc.

If there exist multiple candidate mappings Mt (for the Tt fixed as above), we pick the one such that Mt(t0).Mt(t1) . . . Mt(tk) is the least in a lexicographic order based on the following ordering of the symbols: for two symbols s1, s2 in S, s1<s2 if the first occurrence of s1 in P appears before the first occurrence of s2. In most cases, this "arbitrary" behavior can be avoided by appropriately rewriting the pattern and symbol predicates; for instance, making the predicates mutually exclusive prevents multiple symbols map to the same tuple, eliminating the ambiguity.

With this additional constraint, we can associate a unique pair (Tt, Mt) with a tuple t if the pattern P matches the sequence at t. Each such pair (Tt, Mt) will be called a match of the pattern P.

An Output

The output of the SEQ operator is a table. Each column of the output table is specified as a triple (S', C, F) where S' is a subset of the symbol set S, C is a column in the input schema, and F is an aggregate function—currently one of first, last, count, min, max, sum, avg (see examples).

The output table contains one tuple for each match (T, M) of the pattern in the sequence. The value of a column with specification (S', C, F) is computed by applying F to the column C of the tuples in T that M maps to a symbol in S'. (The examples in the next section should illustrate this effectively.)

The output table schema may also include columns that are expression over the "base" values computed as above. For instance, a column could be specified as (S1, C1, F1)−(S2, C2, F2)*(S3, C3, F3). Computation of such columns is implemented of as a trivial post-processing (projection) on the output of the SEQ operator.

NFA

Instead of matching the input stream directly against the pattern, the algorithm first converts the pattern into a non-deterministic finite automaton (NFA), and used the NFA to identify the matches.

Recall that, in general, an NFA comprises of:
A set of states
A set of transitions between states, labeled either with symbols of an "alphabet", or with an "epsilon"
A subset of states marked as the input states
A subset of states marked as the final states
As earlier, let S be the set of symbols appearing in the pattern; S is the "alphabet" of the generated NFA. Let Q be the set of states. The NFA generated by our algorithm has the following special properties.
There are no "epsilon" transitions
All the transitions out of a state are labeled with the same symbol
There is exactly one final state
There are no transitions out of the final state
The generated NFA is thus compactly represented as:
Q: the set of states
initStates: the set of initial states
qFinal: the final state
stateSymbol(q): maps a state q (except qFinal) to a symbol in S
next(q): maps a state q to a set of states
The algorithm for converting a regular expression pattern to an NFA with the properties mentioned above is well-known (appears in the dragon book).

Pattern Matching Algorithm

A simple minded algorithm to perform the pattern match works as follows. For each tuple in the input sequence, it starts a separate "cursor" over the NFA. The cursor contains the set of initial states when initiated. Each input tuple thereafter has the effect of updating the set of states in the cursor as follows. Let Qi be the set of states in the cursor before the ith tuple is read. Let Si be the set of symbols associated with the ith tuple (recall that a symbol is associated with a tuple iff the tuple satisfies the symbol's predicate). The updated set of states Q{i+1} comprises of all states reachable from a state in Qi through a transition labeled by a symbol in Si. A cursor is deleted as soon as its set of state becomes empty. A match is found when the final state appears in a cursor's set of state; however, since we need the longest match, we need to keep the cursor going till the final state gets removed before declaring a match.

This algorithm, though correct, is expensive because of the large number of cursors being maintained at any given point. However, note that if, at any point, any two cursors contain the same set of states then they contain the same set of states at all points in the future. This presents an opportunity to share work across cursors, and suggests the use of dynamic programming=to achieve the same. Moreover, note that each cursor is actually finding all the matches starting at a given tuple, while we are interested in only the longest one; as we shall see, we use this observation to reduce the space complexity of the solution.

The algorithm avoids the duplication of work in the "future" by traversing the tuple sequence in reverse. For the sake of simplicity of discussion, let us assume that the tuples are indexed in the order in which they are traversed—the last tuple is t[0], the second last t[1], and so on. Suppose the we have traversed n tuples so far, and we are currently at tuple t[n]. The idea is to maintain, for each state q:

The smallest index last[q] such that the tuple sequence t[n]t[n−1] . . . t[last[q]] lead the NFA to start at state q and end at qFinal. (Equivalently, a cursor containing the state q has the state qFinal after traversing the sequence.) If no such index exists, let last[q]=+infinity Let last_n and last_{n−1} denote the contents of last before and after traversing the tuple t[n]. The following holds:

For each q in Q-{qFinal} such that stateSymbol[q] is associated with t[n],
last_n[q]=min_{q' in next(q)} last_{n−1}[q']
For each q in Q-{qFinal} such that stateSymbol[q] is not associated with t[n],
last_n[q]=+infinity
last_n[qFinal]=n+1
At the beginning, last is initialized as:
For each q in Q such that stateSymbol[q] is not associated with t[n] (includes qFinal),
last[q]=+infinity
last[qFinal]=0

These relationships simulate NFA transitions in reverse, and help maintain the contents of "last" in constant time for each tuple traversed. After traversing a tuple t[n], if pos=min_{q in initStates} last[q]<+infinity then we flag a match; it is easy to see that t[n]t[n−1] . . . t[pos] is the longest match starting at t[n].

Constructing the Output Tuples

The algorithm outlined above identifies the matching tuple sequences T for each match (in terms of its endpoints). The crux was in the way the array last was maintained. We now show how an output tuple is constructed alongside in a similar manner.

With each state q, we maintain a tuple ptuple[q] with the same schema as the output table; the columns of ptuple[q] contain the partial aggregates computed over the tuple sequence associated with last[q]. Let ptuple_n and ptuple_{n−1} denote the contents of ptuple before and after traversing the tuple t[n]. The following holds:
For each q in Q-{qFinal} such that stateSymbol[q] is associated with t[n],
Let qprev=argmin_{q' in next(q)} last_{n−1}[q']
ptuple_n[q]=ptuple_{n−1}[qprev]
Update each aggregate in ptuple_n[q] using tuple t[n] associated with the symbol symbolState[q] (Conceptually, this corresponds to assigning M(t[n])=symbolState[q])
For each q in Q such that stateSymbol[q] is not associated with t[n] (includes qFinal), ptuple_n[q]="empty" tuple (corresponds to aggregates computed an empty tuple string)
At the beginning, all elements of ptuple are initialized to the "empty" tuple.

Recall that after traversing a tuple t[n], if pos=min_{q in initStates} last[q]<+infinity then we flag a match; let qmin=argmin_{q in initStates} last[q]. It is easy to see that the columns in ptuple[qmin] contain the specified aggregates, computed over (T, M) where T t[n]t[n−1] . . . t[pos] and M is as mentioned above. The tuple ptuple[qmin] is thus the output tuple corresponding to the match just found.

The algorithm thus makes a single pass over the input sequence, one tuple at a time, constructs the output tuples on the fly, and emits them as soon as a match is found. The space overhead is just the space needed for the arrays last and ptuple, and for the NFA. The number of states in the NFA is exactly one more than the number of symbols (including repetitions) in the input pattern—since the patterns are small, the space overhead for the NFA is negligible.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the various electrical structure and methods may be embodied using transistors, logic gates, and electrical circuits (e.g., application specific integrated (ASIC) circuitry and/or in Digital Signal Processor (DSP) circuitry).

Particularly, an ordered data analysis module 300, an extensible computer process 301, a query planning module 302, an analysis phase 304, an additional analysis phase 306A-N, a monitoring module 314, servers 326, the ordered data analysis module 300, a predicate module 402, a symbol module 404, a determine module 406, a match module 408, a function module 410, a partition module 412, an ordering module 414, an optimization module 630, a SQL instruction module 632, a dynamic interpretation module 634, a function module 636, a developer operation module 638, a translation module 640, and a reference module 642 may be enabled using software and/or using transistors, logic gates, and electrical circuits (e.g., application specific integrated ASIC circuitry) such the ordered data analysis circuit, the extensible computer process circuit, the query planning circuit, the analysis phase circuit, the additional analysis phase circuits, the monitoring circuit, the server circuit, the ordered data analysis circuit, the predicate circuit, the symbol circuit, the determine circuit, the match circuit, the function circuit, the partition circuit, the ordering circuit, the optimization circuit, the SQL instruction circuit, the dynamic interpretation circuit, the function circuit, the developer operation circuit, the translation circuit and the reference circuit, sensor circuit, switches and other circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of a server comprising:
   receiving an ordered data in a relational database;
   matching a pattern specified in a query on ordered data in a relational database in a single pass in constant space for overlapping mode of results;
   applying a function to create an output data in the single pass in constant space for overlapping mode of results based on the matching of the ordered data with the pattern in the relational database query;
   specifying a pattern on the ordered data in the relational database;
   specifying a required result in the relational database;
   matching the pattern in the single pass in constant space for overlapping mode of results with the ordered data; and
   computing the output data;
   wherein the query is at least one of a non-sequential query and an undefined interval query, and
   wherein the function is at least one of an aggregation function, a count function, an average function, and a frequency function.

2. The method of claim 1 further comprising:
   assigning a symbol to a certain tuple in the ordered data based on a predicate;
   responsive to a query, determining which sequence of symbols in the ordered data match the query;
   matching the sequence of symbols in the ordered data to the pattern in a query in the single pass in constant space for overlapping mode of results; and applying a function to determine an output in the single pass in constant space for overlapping mode of results based on the match.

3. The method claim 2 further comprising:
assigning a predicate value to each symbol; and
determining the match of the pattern in the single pass in constant space for overlapping mode of results to the ordered data based on the predicate value assigned to each symbol responsive to the query.

4. The method of claim 3 wherein the ordered data is at least one of a click-stream data, a financial transaction data, a user interaction data, and a time series data.

5. The method claim 1 further comprising:
partitioning the ordered data into at least one group;
ordering the at least one group to form a sequence; and
determining an ordered set of data through the partitioning of the ordered data and the ordering of the at least one group to form the sequence.

6. The method of claim 1 wherein the single pass is a solitary, unidirectional application of a matching algorithm against the ordered of data.

7. A method of a server comprising:
receiving an ordered data in a relational database;
matching a pattern specified in a query on ordered data in a relational database in a single pass in constant space for overlapping mode of results;
creating an output data in a single pass in constant space for overlapping mode of results based on the matching of the ordered data with the pattern in a relational database query;
specifying a pattern on the ordered data in the relational database;
specifying a required result in the relational database;
matching the pattern in a single pass in constant space for overlapping mode of results with the ordered data;
computing the output data;
generating an interpretation of a customizable database request which includes an extensible computer process;
providing an input guidance to available processors of an available computing environment;
automatically distributing an execution of the interpretation across the available computing environment operating concurrently and in a parallel clustered environment, wherein a component of the execution is limited to at least a part of an input data; and
automatically assembling a response using a distributed output of the execution in a single pass in constant time for overlapping mode of results.

8. The method of claim 7, wherein the input guidance is provided to each of the available processors and is comprised of certain portions of the input data, and wherein the input guidance is used to determine which of the available processors are to perform functions related to the at least the part of the input data.

9. The method of claim 7 further comprising:
providing an information to the extensible computer process about its context in the customizable database request, wherein the customizable database request is comprised of at least one of a predetermined function, a developer created function, and an analyst created function;
processing an interpretation of the customizable database request based on the information provided, wherein the extensible computer process is a developer provided-computer program, and wherein the information provided includes at least one of a format of the input data and an output data, whether the input data and the output data is ordered and in which form, grouping information, statistics of the input data and the output data, a distribution information, a length of the input data and the output data, and a custom parameter, wherein the custom parameter is at least one of a number, a string, a list of numbers of strings, a content of a file in the available computing environment, and a result of the customizable database request;
post processing an output of each of the available processors when automatically assembling the response, wherein the post processing includes at least one database operation including at least one of an aggregation operation, a sorting operation, and an invocation of another extensible computer process; and
pre-processing an input of each of the available processors when providing the input guidance to the available processors.

10. The method of claim 9:
wherein the available computing environment is comprised of at least two servers,
wherein the parallel clustered environment is at least two processing nodes operating concurrently and in parallel,
wherein the customizable database request specifies the input data for the extensible computer process, and
wherein the input data is structured in a form comprising at least one of a database table and an output of a different database query.

11. The method of claim 9, wherein the input data is unstructured in a form comprising a content of at least one file in a computing environment.

12. The method of claim 7, further comprising:
detecting a fault in the execution of the interpretation;
automatically rectifying an output effect of the fault, wherein rectifying the output effect of the fault includes at least one of reprocessing an operation;
excluding a corrupted data; and
logging the corrupted data.

13. A relational database system comprising:
a relational database residing on a data source;
a server computer including a processor for executing:
a symbol module to assign a symbol to a certain tuple in an ordered data in said relational database based on a predicate;
a determine module to determine which sequences of symbols in an said ordered data match a pattern in a query;
a match module to match the sequences of symbols in the ordered data to the pattern in a query in a single pass in constant space for overlapping mode of results;
a function module to apply a function to determine an output based on the match;
a partition module to partition an ordered data into at least one group; and
an ordering module to order the at least one group to form a sequence,
wherein the determine module to determine the ordered data through the partitioning of the ordered data and the ordering of the at least one group to form the sequence.
wherein the query is at least one of a non-sequential query and an undefined interval query, and
wherein the function is at least one of an aggregation function, a count function, an average function, and a frequency function.

14. The relational database system of claim 13 wherein the ordered data is at least one of a click-stream data, a financial transaction data, a user interaction data, and a time series data.

* * * * *